Jan. 18, 1966   R. C. BENTON ETAL   3,229,373
APPARATUS FOR CONTROLLING THE POSITION OF A MACHINE TOOL TABLE
Original Filed April 24, 1961   10 Sheets-Sheet 1

INVENTORS.
Robert C. Benton
Roger R. Whitehouse
BY John W. Gaines
THEIR ATTORNEY

Fig. 3

INVENTORS.
Robert C. Benton
Roger R. Whitehouse
BY
THEIR ATTORNEY

Fig. 4

INVENTORS.
Robert C. Benton
Roger R. Whitehouse
BY John W. Gaines
THEIR ATTORNEY

3,229,373
APPARATUS FOR CONTROLLING THE POSITION OF A MACHINE TOOL TABLE
Robert C. Benton and Roger R. Whitehouse, State College, Pa., assignors to Chemcut Corporation, a corporation of Pennsylvania
Original application Apr. 24, 1961, Ser. No. 104,990. Divided and this application Mar. 5, 1963, Ser. No. 268,847
6 Claims. (Cl. 33—125)

The present application is divided from application Serial No. 104,990, which was filed April 24, 1961, and which is again referred to in one of the paragraphs next following.

This invention relates to a machine tool table which is adapted to support a workpiece and which has universal rectilinear movement along two coordinate axes. It relates more particularly to control apparatus for automatically positioning the table by orderly establishment of a sequence of large and small increment settings which are of a cumulative effect enabling the workpiece to be stopped at precisely the right decimal point or points for machining as desired.

Our parent application, of which the instant application is a division, was filed April 24, 1961, U.S. Serial No. 104,990, and is primarily addressed to automatic control apparatus effective in the overall sense to position the table both along one of the axes in a two-stage sequence and, at the same time, along the other axis or axes in a two-stage sequence. The instant application covers binary type setters or positioners by which the increment settings of the table are established to provide the actual end position sought.

The present invention employs the decimal to binary code system of positioning, by which we mean that dial-carrying rotary switches or like devices are provided which will automatically encode decimal machining data set on the dials, into a binary code needed to operate the respective positioners of the present apparatus. For piecework operation the dials are generally manually set whereas for quantity production a tape reader and punched paper tape are provided; the tape is prepunched in binary code enabling the tape reader to control the increment positioners directly.

A highly significant, if not essential, feature of our invention is the provision of a set of code bars in each increment positioner effective to convert binary code information into direct linear measurements by a straightforward mechanical operation. More particularly, each set consisting of several code bars has irregularly spaced teeth provided along one edge of each bar. The resulting spaces between the teeth on the bars are arranged so that only one space between all of the transversely aligned teeth will be completely clear across the bars for each combination of positions of the bars, each such bar being slidable lengthwise a short distance relative to the other bars of the set. We provide an increment positioner setting pin opposite each possibly opened space on the set of code bars, and we bias the pins onto the bar teeth in a manner whereby for every one of the utilized binary coded positions taken by the code bars, only a single setting pin can find a completely free space to move into. These pins in turn are decimally related by their physical position to the increment positioners. They thusly provide an accurate decimal point by which the positioner can preset for each reading for the table as will now be more fully explained.

Features, objects and advantages will either be specifically pointed out or become apparent when, for a better understanding of the invention, reference is made to the description taken in conjunction with the accompanying drawings in which.

More particularly, in reference to FIGURE 1 of the drawings, a machine tool 30 which is selected by way of example for illustrating the present invention consists of a vertical boring mill shown equipped in conventional way with a longitudinal table 32, a curved knee 34 below the table, and a saddle 36 which supports the table 32 and which is supported by the knee 34. The foregoing elements of structure are carried by the base 37 of the machine tool 30 which further includes a motor-driven milling head 38 disposed above the table 32. The table 32 carries a workpiece 40 clamped thereto for receiving some work operation by the head 38.

A positioning control $42_{sad}$ automatically controls the position of the saddle 36 with respect to the knee 34 along an $xx'$ axis transverse to the table 32. A similar positioning control $42_{tab}$ (not shown in FIGURE 1) controls the position of the table 32 with respect to the saddle 36 along the $yy'$ longitudinal axis of the table. The foregoing arrangement is known as a two-axis positioning table.

If desired, a similar positioning control $42_{knee}$, not shown, can be provided for controlling the position of the knee relative to the base 37 along a $zz'$ axis. In this way, certain operations can be automatically performed in three dimensions as the milling head 38 is continually driven.

Figures 1, 2:
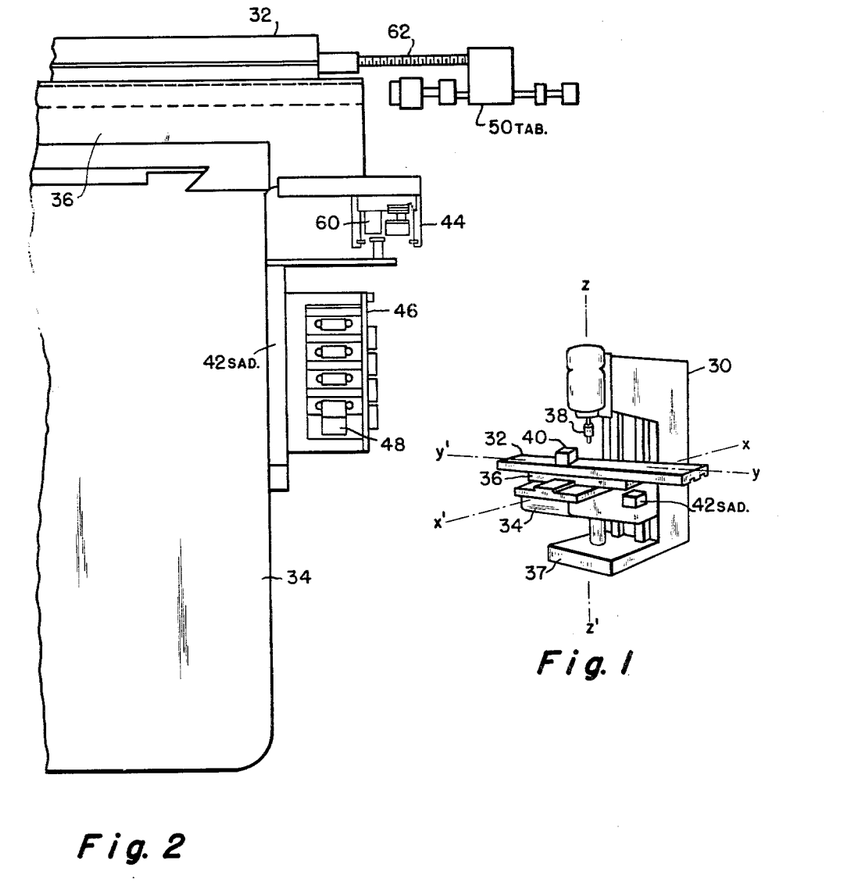
FIGURE 1 is a perspective view of a machine tool embodying the present invention.
FIGURES 2 and 3 are front and side elevational views of the workpiece carrying structure of the machine of FIGURE 1.
Figure 3:
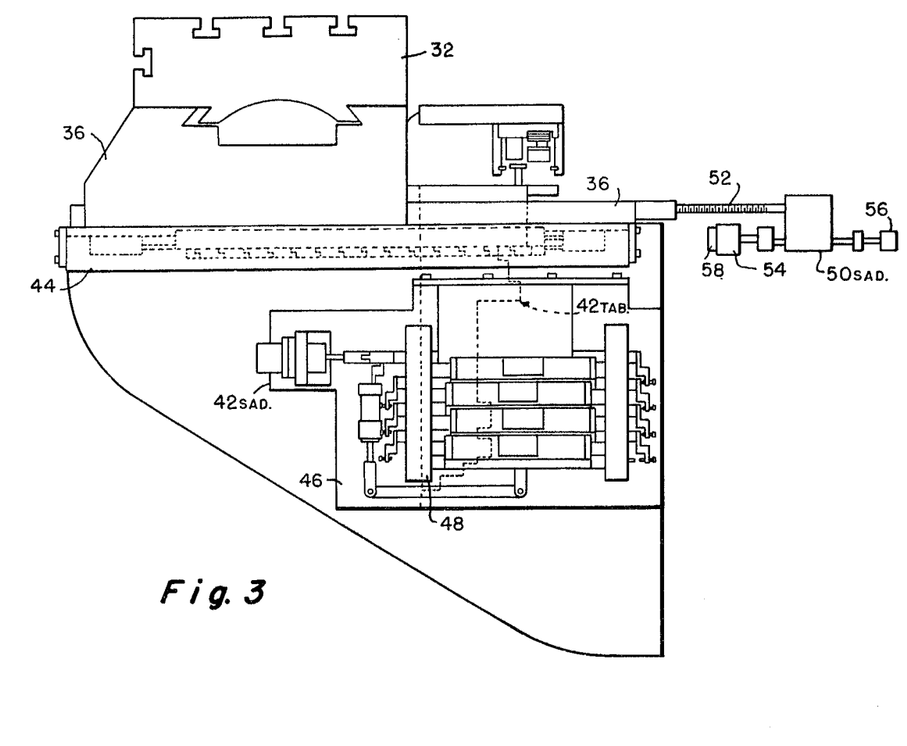

In FIGURES 2 and 3, the positioning control $42_{sad}$ comprises two devices termed positioners. One such device is the large increment positioner 44 which, more accurately defined, is a large increment position setting device. The other device is a small increment positioner 46 comprising a gage mechanism 48.

A table drive mechanism $50_{sad}$ is schematically represented comprising a differential gear box for operating a lead screw 52 connected for driving the saddle 36. The lead screw 52 constitutes the common output shaft of the differential gear box which presents one input shaft driven from a main electric motor 54 and another input shaft driven by a stepping motor 56. The stepping motor 56 is arranged to operate both in concert with the main motor 54 and also without the main motor 54, in which latter case a brake 58 is automatically applied to the main motor 54 to hold the corresponding input shaft fast against rotation.

The gage mechanism 48 of the small increment positioner 46 moves a pawl and feeler mechanism 60 through small increments of travel. The pawl and feeler mechanism 60 is connected to the motors 54 and 56, enabling the small increment positioner 46 to act as a motion determining element to stop the saddle and table 32 in a way presently appearing.

The table positioner $42_{tab}$ constitutes two mutually cooperating increment positioner devices similar to the ones 44 and 46 just described. It also includes a table drive $50_{tab}$ under control of these positioner devices so as to operate the table along its longitudinal axis by means of a lead screw 62 (FIGURE 2). The operation will be apparent from an understanding of the positioners 44 and 46 and, for the sake of brevity, is omitted herefrom.

Figure 4:
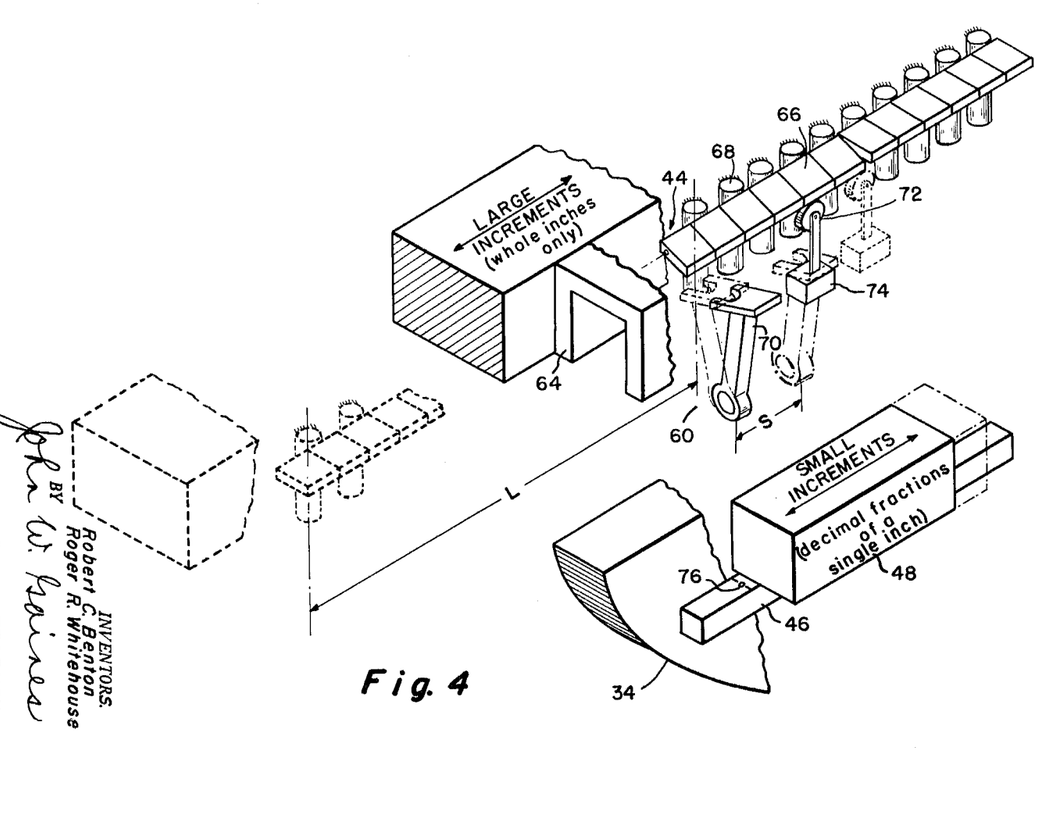
FIGURE 4 is a highly schematic perspective view of a control component appearing in FIGURES 2 and 3 in connection with the work positioning structure.

In FIGURE 4, the pawl and feeler mechanism 60 is shown in a highly schematic way to bring out the cooperation which it establishes as between the large increment positioner 44 and the gage mechanism 48 of the small increment positioner 46. An inverted U channel which is carried by the saddle and which is open at the bottom forms a supporting box 64 for a bi-level, segmentally jointed cam track 66 extending continuously along the interior of the box. Also within the box 64 is a line of depending eccentric pins 68 which are spaced apart accurately one inch center to center and each of which corresponds in number and position with a different joint of the cam track 66 although separately mounted therefrom.

The line of pins 68 and the cam track 66 move longitudinally relative to a V-notched pawl 70 and a riding roller or feeler 72 in the mechanism 60 which is carried by the gage mechanism 48. A finder switch 74 which supports the feeler 72 is connected for support by the mechanism 48 in a way whereby the spaced-apart relation between the pawl 70 and the switch 74 remains constant. With reference to a fixed "zero" point 76, the gage 48 can move the pawl and feeler mechanism 60 to a point anywhere between $0'' \pm 0.0001''$ and $0.0000'' \pm 0.0001''$. This distance of travel is indicated by the numeral S in FIGURE 4 and the connections between the gage 48 and the pawl 70 and switch 74 supported thereby are indicated by dotted lines.

In operation, the line of pins 68 and the bi-level cam track 66 move through a large increment L to a point at which the feeler 72 detects the location of a break in the cam track. At the point where it rides from the level at the high side of the break onto the low side or vice versa, the feeler 72 operates the finder switch 74 in a way to trip the pawl 70 and pivot it into contact with the appropriate confronting pin in the line of pins 68. At that point, the small increment positioner 46 functions with its motion determining action in a manner presently appearing so as to stop the movement at the prescribed point set by the gage mechanism 48.

Figure 5:
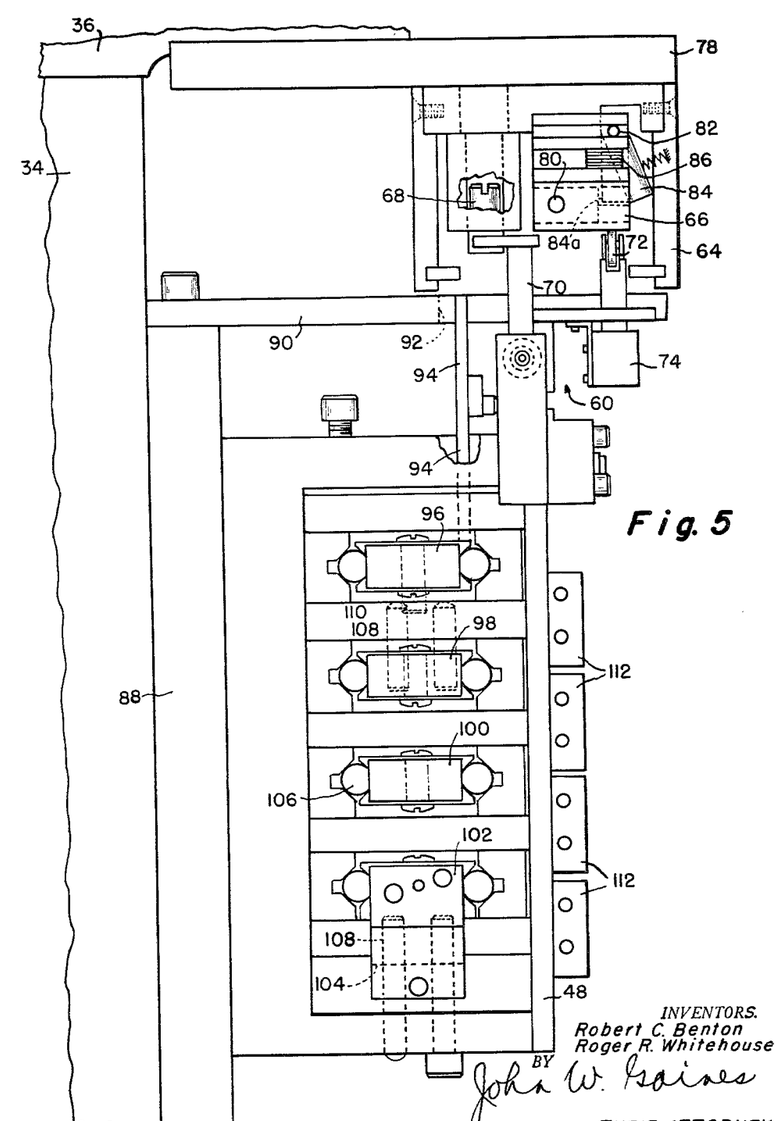
FIGURE 5 is a side elevation corresponding with FIGURE 2 but being to an enlarged scale for showing the control component.

In FIGURE 5, a plate 78 which carries the supporting box 64 is affixed to the relatively movable element which, according to the illustration, consists of the saddle 36. A first shaft 80 supported within the box 64 carries the individual segments of the cam track 66 and a parallel shaft 82 carries a row of pivoted stops 84, each of which is pin shaped and can pivot in the general direction of the first shaft 80. The stops 84 are blocked by a set of code bars 86 effective to prevent all but one of the stops 84 from swinging into the dotted line position 84a. The associated segment of the cam track 66 is blocked from pivoting upwardly about the first shaft 80, as viewed in FIGURE 5, by which ever stop 84 that occupies the dotted line position 84a.

A plate 88 which supports the positioning control 46 is made fast to the relatively fixed element consisting, in the illustration of FIGURE 5, of the knee 34. A horizontal guard plate 90 is secured by screws at its inner end to the plate 88 and presents a horizontal opening 92 through which the pawl and feeler mechanism 60 projects. A supporting plate 94 for the pawl and feeler mechanism projects at its upper end into the plane of the opening 92 and, at the lower end, it is carried by the relatively most movable one (96) of a set of positioning bars 96, 98, 100, 102 and 104, included in the gage mechanism 48.

Each of the positioning bars is supported in ball bearing runways 106 and they move with reference to the relatively fixed positioning bar 104. Each positioning bar carries a row of double pin projections 108 on its upper face, as viewed in FIGURE 5, and a row of single pin projections 110 on its lower face, as viewed in FIGURE 5. Gage pins (not shown) are introduced so as to intervene crosswise between the projections on the positioning bars and stop them with gage-like precision in their movement as will presently appear. Included for this purpose is a series of code bar positioning cylinders 112 carried by the gage mechanism 48.

Figure 6:
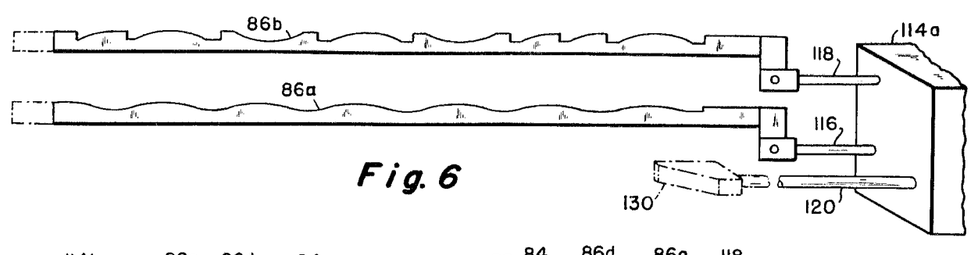
FIGURE 6 is an exploded view of a portion of the code bars appearing in end view of FIGURE 5.

In FIGURE 6, one of a pair of air cylinder units 114a is illustrated for operating the code bars 86 (FIGURE 5). According to the illustration, the code bars are rotated slightly out of position and are differentiated by the subscrips a and b; each of these code bars 86a and 86b has a serrated upper edge displaying teeth, the gaps of which can be aligned at one point only at any one time so that the corresponding stop 84 (FIGURE 5) can pivot into segment stopping position. The code bar 86a is operated by an air operated plunger rod 116 carried by the unit 114a and a similar plunger rod 118 operates the code bar 86b. Each of the plunger rods 116 and 118 can move the connected code bar between opposite ends of a path of travel delineated by the solid lines and dotted lines respectively in FIGURE 6.

Preferably four code bars are used in which case the permutations and combinations possible, taking into account that each code bar has two positions, enable any one stop of the row of stops 84 to be selectively dropped into segment stopping position. The air cylinder unit 114a further carries a cam connected plunger rod 120 for the particular usage now explained.

Figure 7:
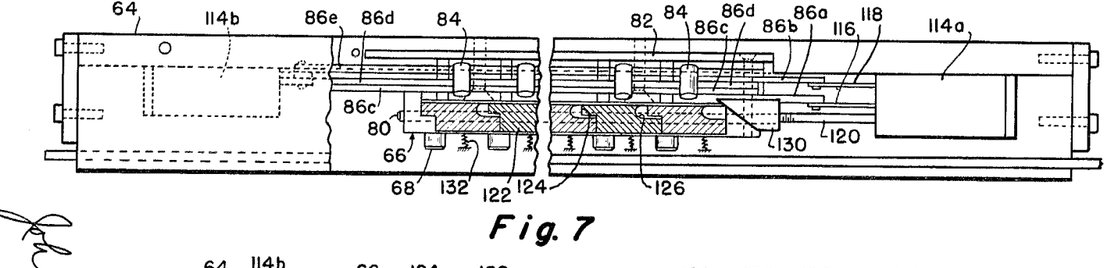
FIGURE 7 is a side elevational view of the cam track, partially broken away, which appears in end view in FIGURE 5.
Figure 8:
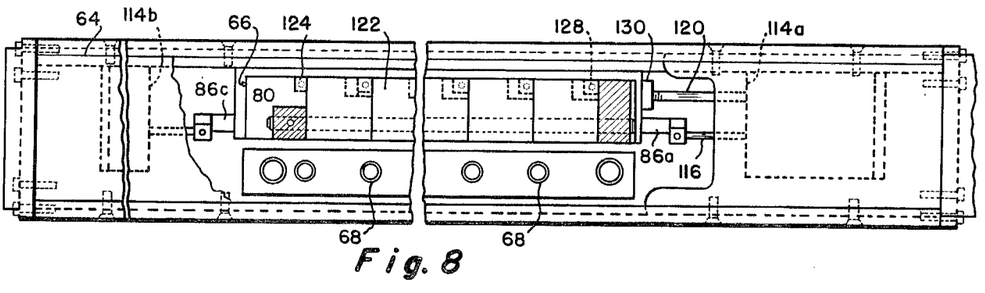
FIGURE 8 is a bottom plan view of the cam track of FIGURE 7.
Figures 9, 10, 11, 12:
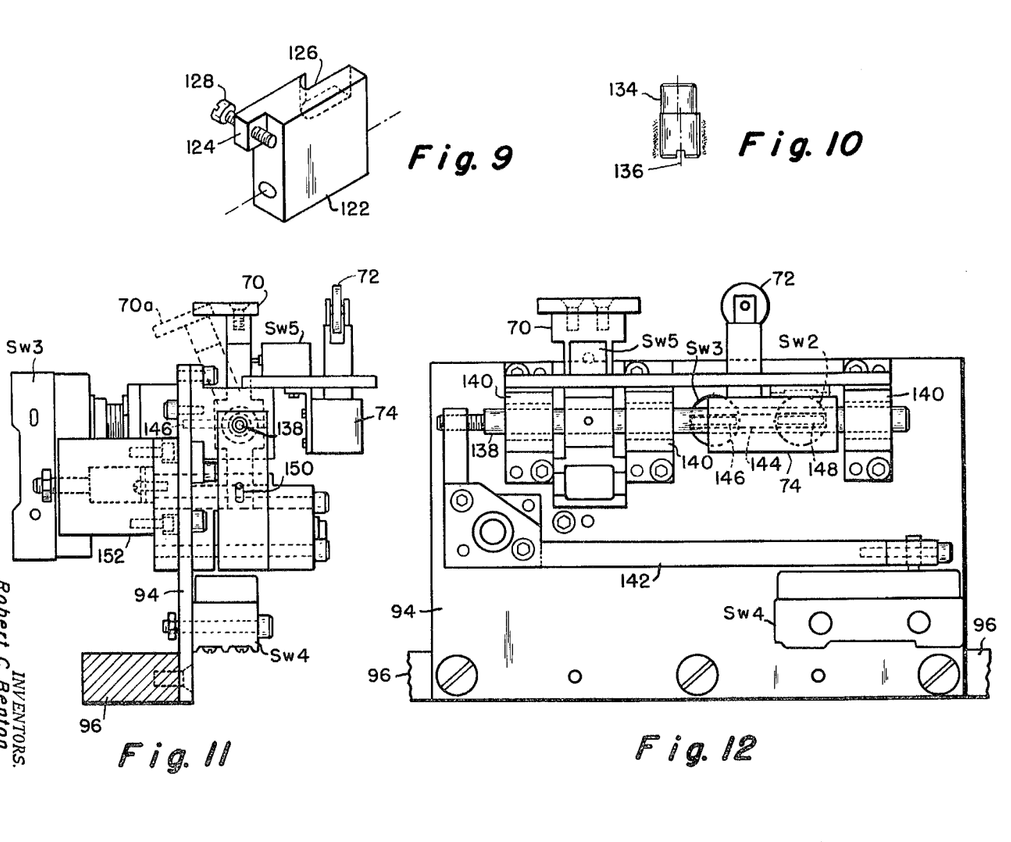
FIGURE 9 is a perspective view of a typical segment of the cam track.
FIGURE 10 is a longitudinal view of the eccentric constituting one of the pawl pins shown in a broken out section of FIGURE 5.
FIGURE 11 is a view corresponding to FIGURE 5 showing the table motion determining mechanism broken away for clarity.
FIGURES 12 and 13 are side elevational and bottom plan views of the motion determining mechanism of FIGURE 11.

In FIGURES 7, 8 and 9, the cam track 66 is formed of individual segments 122. They each carry a projecting blocker 124 at one outer corner and are rabbeted to provide a relieved portion 126 at the other outer corner for receiving the blocker of the next adjacent segment 122. For proper alignment, each projecting blocker 124 carries a set screw 128 which makes contact with the floor of the adjacent relieved portion 126.

At one end of the line of segments 122, a beveled cam 130, carried by the previously noted cam plunger rod 120 of unit 114a, is effective when advanced to rotate the line of segments 122 simultaneously in one direction (downwardly in FIGURE 7) and this rotation is opposed by means of individual biasing springs 132. Retraction of the cam 130 enables the segments to reversely rotate together only to a point permitted by the actuated stop 84 and from that point to the left of the stop 84, no farther movement of the segments is allowed; rightwardly, however, of the selected stop 84, as viewed in FIGURE 7, the segments 122 so located can move an additional distance upwardly about their shaft 80, thus defining a bi-level profile on the cam track 66.

Selection of the appropriate stop 84 is accomplished by the noted code bars 86a and 86b and a cooperating set of code bars 86c, 86d and 86e nested parallel therewith and operated by a companion air cylinder unit 114b. In case a single row composed of two decades of the stop pins 84 in series is employed, the code bar 86e is solely for the purpose of selecting which decade will furnish the selected stop 84.

One of the eccentric pins referred to is disclosed in full showing in FIGURE 10 and having an eccentric portion 134 on the pin. Rotation of the pin about its main axis 136 enables an adjustment to be made of the type required to set the pins 68 at the right center distances previously described, and without the expense of extentive precision machining.

Figures 13, 14:
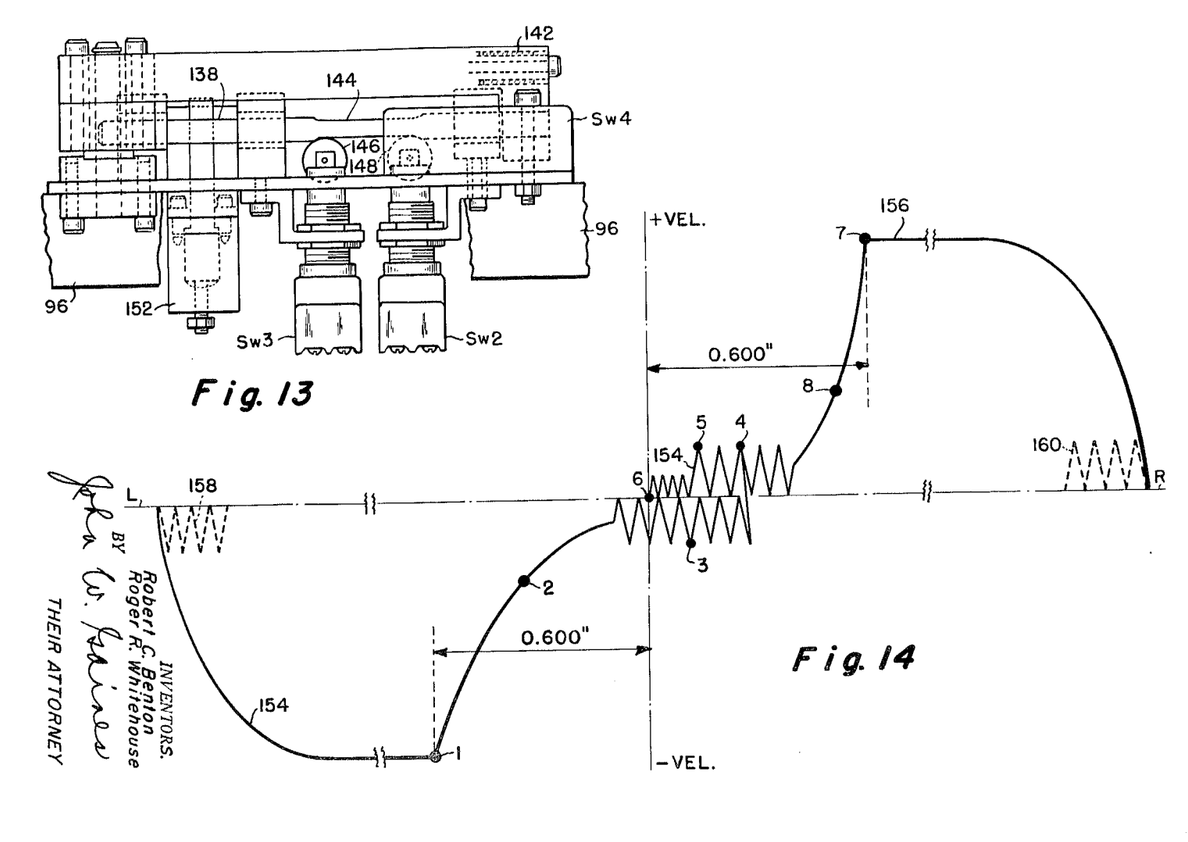
FIGURE 14 is a velocity displacement diagram to show the stopping pattern effectuated by the motion determining mechanism.

FIGURES 11, 12 and 13 show details of the structure which carries the pawl and feeler mechanism 60 and which is supported on the mounting plate 94 for movement with the positioning bar 96. More specifically, the chief operating element of this structure comprises a slidably and rotatably mounted cam shaft 138 which rides in bearings 140 for supporting the pawl 70 of the pawl and feeler mechanism.

At one end, the shaft 138 controls a switch-operating, bell crank 142. At a relieved mid-portion 144, the shaft presents a pair of spaced-apart cam shoulders controlling a pair of switch-operating, cam followers 146 and 148. The cam followers are spring-biased so as to constantly urge the shaft 138 to a re-centered position with the portion 144 therebetween. The pawl 70 is fast to the shaft 138 and by means of a pin and slot connection 150 to a single acting air cylinder 152, is caused to rock, rocking the shaft therewith. The pawl is retracted by a return spring not shown.

The balance of this structure is comprised by the noted finder switch 74 and other switch components which are included in control circuits for the various drives typified by the drives 50$_{sad}$ and 50$_{tab}$ of FIGURES 2 and 3. The operation and location of these components will be described briefly as an aid in understanding the operating sequence hereinafter appearing.

Finder switch 74: This switch is included in the operating circuit, not shown, of one stepping motor 56 and the corresponding main motor 54 and its brake 58; it is operated by the feeler 72 which is either extreme of its movement inherently operates the control circuit whereby the motors 54 and 56 will cause relative movement in a direction seeking to transversely align the feeler and the break in the cam track. The riding feeler 72 undergoes a transition of position when the break in the cam track rides thereunder and the switch 74 operates to deenergize and brake the motor 54 thus making a first speed reduction establishing slowdown to medium relative speed (e.g., stepping motor operates at 72 r.p.m. shaft speed). Simultaneously, owing to the fact that the switch 74 is included in a control circuit, not shown, for the single acting air cylinder 152, the switch causes the pawl 70 to be forced into the operating position 70a against the urgings of a return spring, not shown.

Slowdown switch SW2: This switch is operated by the cam follower 148 and is included in a control circuit, not shown, for the stepping motor 56. When movement of the relieved portion 144 of the shaft 138 is from right to left as viewed in FIGURE 13, the switch SW2 is operated to make a reduction in the speed of the stepping motor 56 so as to establish a full slowdown condition of movement (e.g., the stepping motor shaft speed reduces to ⅒ r.p.m.).

Reversing switch SW3: This switch is operated by the cam follower 146 and is included in a control circuit, not shown, for the stepping motor 56, when the switch SW3 is actuated by movement of the relieved portion 144 of the shaft from left to right as viewed in FIGURE 13, the relatively moving part will have overdrifted past its assigned position and, at this point, the stepping motor will be reversed and latched for reverse drive operation by means of a latching relay, not shown.

Stopping switch SW4: This switch is operated by the switch operating bell crank 142; when released by the bell crank 142 owing to relative movement of the shaft 138 in the right-to-left direction as viewed in FIGURE 12, the switch SW4 open circuits the control circuit, not shown, for the stepping motor 56 so as to stop all relative movement.

Interlocking switch SW5: This switch is included in various anticycling and interlock circuits, not shown, which contribute materially although in conventional manner to make the operation foolproof. In the interests of brevity, the foregoing circuits will not be specifically described, but it will be apparent that a new cycle will not be permitted to start by the switch SW5 until the pawl 70 is fully retracted by means of the return spring, not shown. Consequently, the pawl is never caught between pins or still in a pin engaging position when the positioning motors are reenergized.

The stopping sequence accomplished by the table motion-determining structure is shown according to a velocity displacement diagram in FIGURE 14. Consistent with the structure as viewed in FIGURE 12, the final motion of the shaft 138 and, hence, the final relative motion in the velocity displacement diagram are in the direction from right to left at which the switch operating bell crank 142 finally releases the switch SW4 to stop all motion. On the other hand, velocity and displacement originally in the leftward direction as viewed in FIGURE 14 are shown to have negative characteristics.

More particularly, the negative velocity curve 154 is attended by the following sequence of steps.

(1) The feeler 72 rides over the break in the cam track thus concluding the finding function. The finder switch 74 therefore at the point 1 (indicated on curve 154)
    (a) transfers control of the drive mechanism to switches SW3 and SW4,
    (b) deenergizes the main drive motor 54 and energizes the brake 58, and
    (c) pivots the pawl 70 into its operating position by means of the air cylinder 152, (2) As the brake is being applied thus to reduce the velocity of the still moving main motor mechanism, the outmoving pawl 70 straddles a passing pin 68 but with sufficient prematurity that the V-notch of the pawl attempts to make it move in an opposite direction from the pin motion temporarily. Consequently, the bell-crank-operated switch SW4 is released and simultaneously the cam shaft-operated switch SW3 is released so as to disable the stopping circuit, not shown, containing SW4; as a result, the switch SW4 is disabled temporarily to prevent it from stopping the table. The stepping motor therefore continues jogging the table to move it past the stopping point, doing so at medium speed due to on-off current pulsations through the stepping motor.

(3) The pawl 70 firmly seats itself on the passing pin so that at point 3 on the curve 154 the pawl undertakes the same motion of the table from left to right.

(4) The table moves the pawl 70 so as to reclose the temporarily released stopping switch SW4 and so as to reclose the temporarily released reversing switch SW3 thus reversing the stepping motor. The reversal is completed at point 4 on the curve 154 whereafter movement is from right to left (as viewed in FIGURE 14) at medium speed produced by the stepping motor.

(5)(6) Continued movement of the shaft 138 causes, at point 5 on the curve 154, the stepping motor to be set in slowdown. With discrete motions, therefore, each consisting of a part rotation followed by an interval of no motion, the table is jogged toward the stopping point indicated at 6 at which the bell-crank-operated switch SW4 is released so as to stop the table.

The opposite motion is from right to left as viewed according to curve 156 of FIGURE 14, and the sequence is as follows.

(7) The finder switch at point 7 deenergizes the main drive motor 54 and sets the brake, and also it operates the pawl and transfers the drive to the control of the switches SW3 and SW2.

(8) At point 8 on the curve 156, the V-notched pawl and the cam shaft 138 have temporarily taken a direction of movement opposite from that of the table so that the stopping switch SW4 is actuated to be available for stopping the table. The pawl, after a false start the wrong way, quickly reverses its motion so as to take the same motion as the table.

(9) Upon movement of the pawl to point 4 along the curve 156, it is seen that at this point the two curves 154 and 156 merge and the operation proceeds to point 5 and to the stopping point 6 in the previous manner.

The curves 154 and 156 of FIGURE 14 are not drawn to scale. Moreover, they are smooth shaped as shown where as actually the velocity is a composite with the main drive motor furnishing smooth torque, and with superposition thereon from 158 and 160, of the jogging torque of the stepping motor which starts running each time the main drive motor 54 starts running. The characteristic of the instantaneously applied and released jogging torque is that it is never attended with residual stress left in the drive, such as might lead to elastic disturbances in the system later causing overtravel.

The electrical circuits which operate the motors in response to actuation of the foregoing switches are well known in the art and therefore not illustrated.

Figure 15:
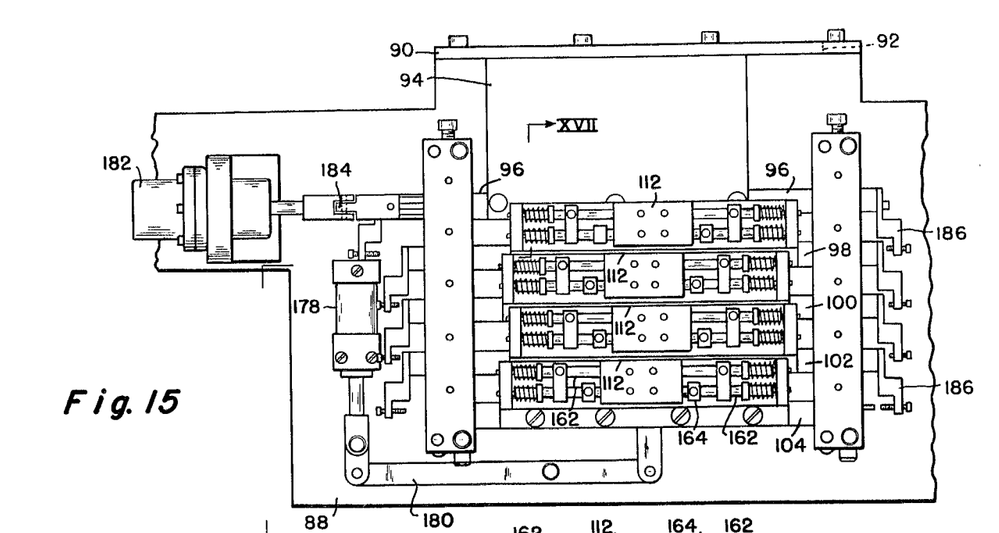
FIGURES 15 and 16 are front elevational and bottom plan views of the gage mechanism in the small increment positioner appearing in FIGURE 5.
Figure 16:
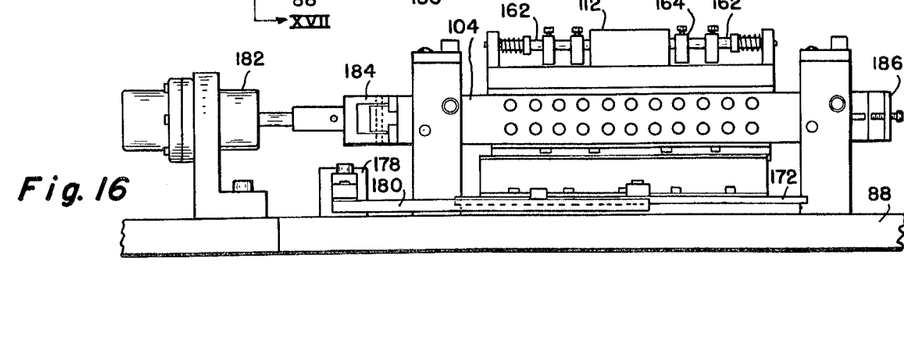
Figure 17:
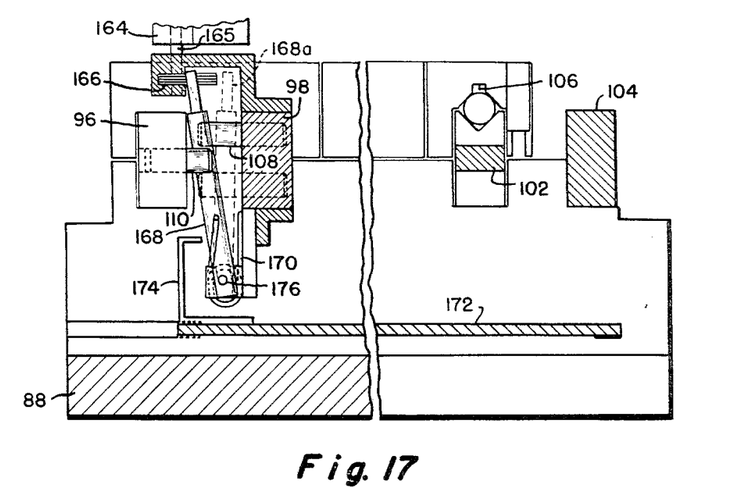
FIGURE 17 is a section taken along the lines XVII—XVII of FIGURE 15 to show one of the gage pins.

In FIGURES 15, 16 and 17, the air cylinders 112 are shown mounted to the gage mechanism at points between each set of the code bars 96, 98, 100, 102 and 104. These cylinders control code bar positioning shafts 162 which are spring returned to a normal inward position as viewed in FIGURE 15 but which are separately air operated to move outwardly. Each shaft 162 carries a fixed collar 164 connected by means of an inwardly protruding pin 165 to one code bar in each set of four code bars 166 (FIGURE 17). Each of these sets of the code bars 166 controls, by means of gapped teeth in a manner presently appearing, a decade 168 of gage pins already referred to; in this way, individual gage pins of each decade 168 can be selectively moved from the dotted line position 168a to the solid line position shown in FIGURE 17. Thus, one pin of each decade is selectively trapped between the row of double lateral projections 108 and the row of single lateral projections 110 carried between the respective positioning bars. Each of the single projections 110 is an eccentric pin of the type shown in FIGURE 10 so as to provide highly accurate, center to center adjustment.

Torsion springs 170 individual to the pins of each decade 168 urge them toward the solid line position of FIGURE 17 whereas a resetting plate 172 is slidably mounted with relation to the attachment plate 88 for resetting all decades of pins at once. For this purpose, a series of angle members 174 (FIGURE 17) protrudes upwardly in engagement with the bottom portion of the pin decades, each decade of which has a fixed pivot shaft 176.

A single acting air cylinder 178 is connected by means of a link 180 pivoted intermediate its ends to reciprocate the plate 172 under power. A double acting air cylinder 182 has a universal joint connection 184 to the most relatively movable one 96 of the positioning bars. Due to Z-shaped members 186 each carrying a set screw and affixed at a corresponding end of the positioning bars, the arrangement is such that retractive motion of the air cylinder 182 retracts the positioning bar 96 and all other bars in unison.

Advancing motion of the double acting air cylinder 182 causes advance of the bar 96 with respect to the relatively fixed bar 104 whereby each intervening positioning bar 98, 100 and 102 owing to the interposed gage pins and projections at each side thereof, is advanced. The point of stopping of each bar occurs where the associated decade pin is restrained by being trapped against the projections carried by the adjacent, less relatively movable positioning bar. Thus, the positioning bar 96 by which the pawl and feeler mechanism attached to the plate 94 is caused to move, undergoes the aggregate of all relative movements.

Figure 18:
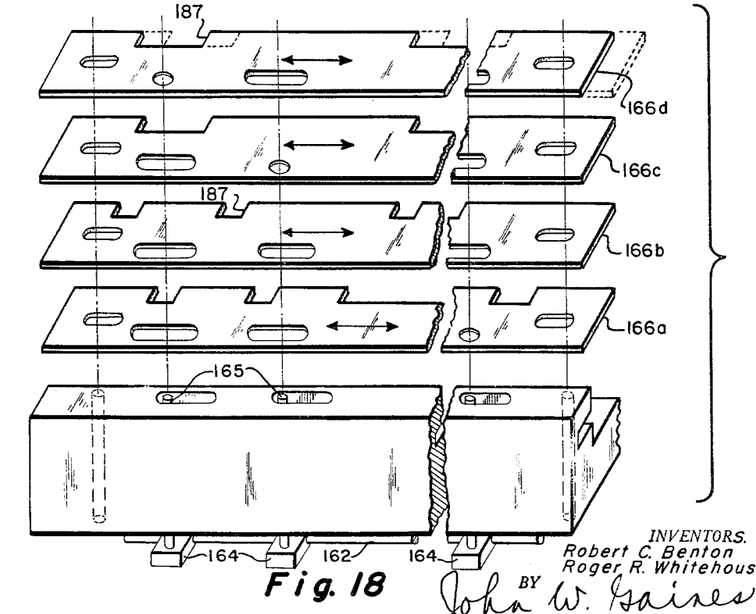
FIGURE 18 is an exploded view of the code bars appearing in FIGURE 17 for positioning the gage pins.
Figure 19:
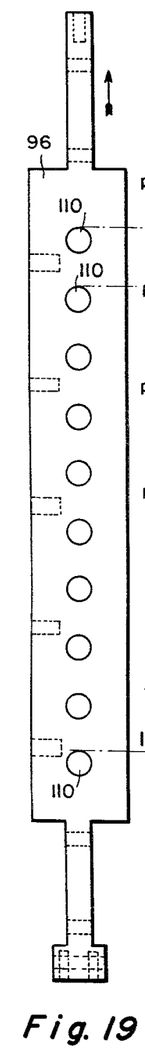
FIGURES 19, 20, 21, 22 and 23 are longitudinal plan views of the positioning bar elements forming the gage mechanism of FIGURES 5 and 15.
Figures 20, 21, 22:
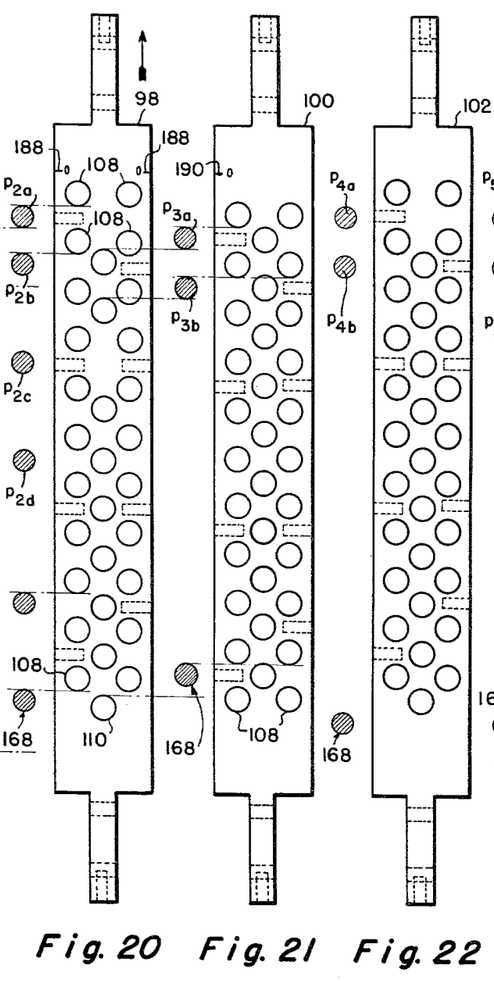
Figure 23:
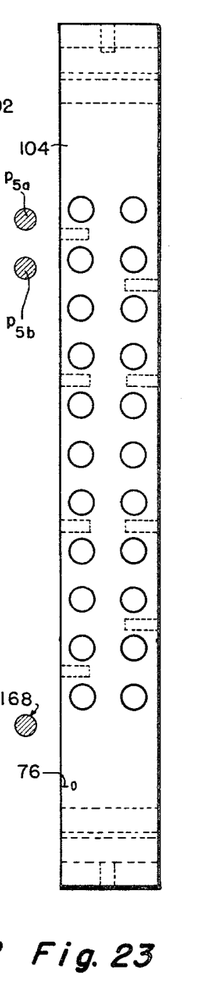

The code bars 166 of preceding FIGURE 17 are shown identified in FIGURE 18 with appropriate subscripts so as to read 166a, 166b, 166d and 166c. They each move between a set of two extreme positions, which, in the example of bar 166d, are shown by dotted lines and solid lines. The irregular teeth 187 thereon are so arranged that only one of the gage pins in a decade 168 can move into a position trapped between projections on the confronting positioning bars. The code bars are operated by the aforementioned air cylinders 112 which are responsive to a binary code input signal.

In FIGURES 19, 20, 21, 22 and 23, the positioning bars 96, 98, 100, 102 and 104 are shown rotated out of their operating position (FIGURE 17) for clarity; it will be understood that the single pin projections 110 on the positioning bar 96 will confront the double row projections 108 on the adjacent positioning bar 98; likewise, the row of single pin projections 110 on the positioning bar 98 will confront the double row of projections 108 on the next adjacent positioning bar 100, etc.

Appropriate adjustment of the eccentric portion 134 (FIGURE 10) of the single pin projections 110 on the bar 96 enables the following relationship to precisely occur: when the shoulder of the bar 96 advances according to the arrow to a point squarely opposite a zero reference point 188 on the bar 98, a trapped pin $p_{2a}$ of the decade 168 of gage pins squarely intervenes between the adjacent leading pin projection 110 and the leading double projections 108 on the positioning bar 98. If, instead, the next gage pin $p_{2b}$ of decade 168 were to be trapped between a corresponding single projection 110 and the confronting double projections 108, the positioning bar 96 would require movement of 0.1000″ past the zero reference point 188 on the bar 98.

In a similar manner for gage pins $p_{2c}$, $p_{2d}$, etc., the relative position of the bar 96 can be accurately gaged to relatively extend by a selected distance of, for exmple, 0.3000″, 0.5000″, etc., past the zero reference mark 188 on the less relatively movable positioning bar 98.

The eccentrically adjusted single pin projections 110 on the bar 98 and the double projections 108 on the adjacent bar 100 are so related that when they trap the respective gage pins $p_{3a}$ or $p_{3b}$, etc. of the intervening decade 168 therebetween, the zero reference mark 188 takes a position either squarely aligned with a zero reference mark 190 on the bar 100 or else 0.0100″ therepast or 0.0200″ therepast or 0.0300″ therepast, etc. in the direction of the arrow.

The gage pins $p_{4a}$, $p_{4b}$, etc. within the next decade 168 are trapped between the projections to establish the differences of relative position magnitude of 0.0000″, 0.0010″, 0.0020″, etc.; the pins $p_{5a}$, etc. in the final decade 168 establish the relative readings of 0.0000″, 0.0001″, 0.0002″, etc. The result is that by proper selection of gage pins, the positioning bars of the gage mechanism 48 become an automatic gage for the position of the pawl and feeler mechanism at any point between 0.0000″ and 0.9999″, inclusive, with the readings having good repeatability accurate to the nearest ±0.0001″.

At the beginning of each gaging cycle, the double acting air cylinder 182 unloads the positioning bars by full retraction of the positioning bar 96 which through their Z-shaped interconnection members 186 retracts the others.

therewith. The single acting cylinder 178 is actuated to pivot the lever 180 clockwise as viewed in FIGURE 15 causing the spring biased decades 168 of gage pins to be freed by the angle members 174 from the teeth of the code bars 166 (FIGURE 17). The code bars 166 are then repositioned whereupon an opposite sequence transpires, namely the cylinder 178 is released enabling the selected pins of the decades 168 to move into a position (FIGURE 17) between the right code bar teeth, and the cylinder 182 reverses and reloads the positioning bars so that they take their next advanced setting as limited by the gage pin decades 168.

The foregoing gaging cycle is repeated following each machining operation.

In over-all operation of a two axis or three axis positioning table according to the preceding figures, decimal machining data is introduced either directly by means of the dials referred to or else after having been encoded on tape in a binary code form. One gage mechanism 48 (FIGURE 4) of the small increment positioner 46 of each positioning control operates to set the fractional decimal portion of the reading required with relation to the zero reference point 76 (FIGURE 4), in readiness for the pawl 70 ultimately tripping the stopping switch and stopping the table when it reaches that fractional decimal reading. Thereafter, in response to binary code input to a tape reader, not shown, the motor units 114a and 114b cause a selected one of the stops 84 and the cam 130 to be activated in sequence. As a result, the cam track 66 will be manipulated producing a break in the joint at a point corresponding to the whole number of each decimal reading encoded, i.e., one inch or some multiple thereof. Both motors 54 and 56 are then put in operation (FIGURE 3) setting the table drive in motion. The feeler 72 of FIGURE 4, when on the high side of the break in the cam track profile, will operate the finder switch 74 causing automatic relative movement one way in the direction of the low side whereby the switch and the break in the joint will straightforwardly be brought together; when on the low side of the break on the cam track profile, the feeler 72 will operate the finder switch so as to cause automatic relative movement in the opposite way in the direction of the high side whereby the break in the joint will seek the switch.

Subsequent activation of the pawl 70 causes the table to overrun its ultimate position, or not, dependent in accordance with FIGURE 14 upon the direction of approach of the fast moving pins 68 relative to the pawl 70. In either case, final motion of the pin 68 engaged by the pawl 70 results in tripping open the stopping switch SW4 and stopping the table. When table motion on all axes has reached a fully satisfied position, the table drive motors will be still and the table is locked so that a workpiece carried on the work table has a firm position for machining at the established point.

Variations within the spirit and scope of the invention described are equally comprehended by the foregoing description.

We claim:

1. The combination, in a table positioning structure, of a set of positioning bars including at least one intervening bar and being parallelly shiftable, said bars having projections on each side thereof extending toward projections on the adjacent bar so as to form a collective group of projections between the bars, a set of decade setting pins cooperatively related with each collective group of projections at points along the bars to drop transversely to a station interposed with respect to adjacent projections, means supporting the sets of bars and setting pins in the operative relationship described whereby only one pin of each set takes an interposed station, and means to advance the most relatively movable bar with respect to the relatively fixed one of the bars whereby each intervening bar, owing to the station of the interposed pins on each side thereof, is advancedly positioned by one of the pins in connection with the more relatively movable bars through a distance terminating at a point of stopping where the other of the pins is restrained by the less relatively movable bars on the other side.

2. A combination, in table positioning structure, comprising a set of positioning bars including at least one intervening bar and being parallelly shiftable, said bars having projections on each side thereof extending toward projections on the adjacent bar so as to form a collective group of projections between the bars, a set of decade setting pins cooperatively related with each collective group of projections at points along the bars to drop transversely to a station interposed with respect to adjacent projections, means supporting the sets of bars and pins in the cooperative relationship described, code bar means preventing said pins from dropping and positionable whereby only one pin of each set takes an interposed station, and means to advance the most relatively movable bar with respect to the relatively fixed one of the bars whereby each intervening bar, owing to the interposed pins on each side thereof, is advanceably positioned by said one interposed pin in connection with the more relatively movable bar thereadjacent to a point up to but stopping where the other of the pins is restrained by the less relatively movable bar on the other side.

3. The combination with the moving table of a machine tool for carrying a workpiece of a positionable gage along the path of movement of said table comprising movable positioning bars, a decade of gage setting pins in the space between each two adjacent bars, means on each bar whereby it and the next bar can mutually engage the respective gage setting pins therebetween, power controlled means operative to position a selected gage setting pin amongst each decade of said pins, effectively enabling each bar to support a gage pin in a path to engage and restrain the next bar in its path of movement, and automatic operating means controlling the last-said means whereby a selected one only of the gage pins of each decade is at any time moved into the path of the engageable means on the respective positioning bars.

4. Apparatus for controlling the position of a member, such as the table of a machine tool, comprising drive means therefor, and control means for automatically controlling the drive means, in which the control means includes a plurality of parallel movable positioning bars comprising at least one intervening bar, a decade of setting elements between each pair of adjacent bars, means on each bar whereby it and the next bar can mutually engage the respective setting elements therebetween such that relative movement between the bars is limited at the point when a setting element is trapped in an operative position between the bars, and means for moving a selected one of the setting elements of each decade into its operative position.

5. Apparatus as claimed in claim 4, in which each decade of setting elements and the aforesaid engaging means on the associated pair of positioning bars define rows with uniform spacing from point to point therein which decimally differs from the spacing in the rows defined by the other decades and engaging means so as to establish a different decimal place in the numerical value of linear displacement of the most movable positioning bar.

6. Apparatus for controlling the position of a member such as the table of a machine tool, comprising drive means therefor, and control means for automatically controlling the drive means; said control means including a set of parallel movable positioning bars, sets of setting elements between each pair of adjacent bars, means on each bar whereby it and the next bar can mutually engage the respective setting elements therebetween, such that relative movement between the bars is limited at the point when a setting element is moved into an operative position trapped between the bars, and third means for moving a selected one of the setting elements of each set into its operative position; said setting elements consisting of gage pins spaced apart along the length of the third means; said third means consisting of sets of parallel code bars individually movable in a direction parallel to their length, and each bar having a non-uniform profile; the profiles of said code bars being such that in any combination of positions of the bars of a set only a selected one of the gage pins will be in registry with a high or low point on the bars so as to enable that one gage pin to move into the operative position aforesaid.

References Cited by the Examiner
UNITED STATES PATENTS

| | | | |
|---|---|---|---|
| 2,468,325 | 4/1949 | Eisele | 33—125 X |
| 2,876,543 | 3/1959 | Dzaack | 33—1 |
| 2,908,978 | 10/1959 | Knosp et al. | 33—125 |

LOUIS R. PRINCE, *Primary Examiner.*

ROBERT B. HULL, *Examiner.*

UNITED STATES PATENT OFFICE
CERTIFICATE OF CORRECTION

Patent No. 3,229,373                              January 18, 1966

Robert C. Benton et al.

It is hereby certified that error appears in the above numbered patent requiring correction and that the said Letters Patent should read as corrected below.

In the drawings, Sheet 9, Fig. 18, the leftmost centerline is at the wrong end of the four slots, which slots should be moved and re-aligned, receiving in their right ends the centerline; column 3, line 52, for "0.0000" read -- 0.9999 --; column 4, line 37, for "subscrips" read -- subscripts --; column 8, line 48, for "exmple" read -- example --.

Signed and sealed this 17th day of January 1967.

(SEAL)
Attest:

ERNEST W. SWIDER                              EDWARD J. BRENNER
Attesting Officer                                      Commissioner of Patents